United States Patent [19]

Sivahop et al.

[11] 4,314,307

[45] Feb. 2, 1982

[54] ELECTRO-MECHANICAL SENSOR POWER UP CIRCUIT

[75] Inventors: Albert Sivahop, Stratford; Don L. Adams, Sr., Fairfield; William C. Fischer, Monroe, all of Conn.

[73] Assignee: The United States of America as represented by the Secretary of the Navy, Washington, D.C.

[21] Appl. No.: 146,821

[22] Filed: May 5, 1980

[51] Int. Cl.³ .................................................. H01H 63/36
[52] U.S. Cl. .................................... 361/194; 307/142; 361/189
[58] Field of Search ....................... 361/194, 189, 190; 307/142

[56] References Cited

U.S. PATENT DOCUMENTS

| | | | |
|---|---|---|---|
| 3,629,608 | 12/1971 | Trindle | 361/194 |
| 3,781,651 | 12/1973 | Heidel | 361/194 |
| 3,826,954 | 7/1974 | Neher | 361/189 |

*Primary Examiner*—J. D. Miller
*Assistant Examiner*—L. C. Schroeder
*Attorney, Agent, or Firm*—Robert F. Beers; Arthur A. McGill

[57] ABSTRACT

An electrical circuit for allowing electrical power to be applied to the electro-mechanical sensors of an automatic flight control system of an aircraft only when either the Engine Start switch or AFCS Engage switch is closed separately or simultaneously. Upon the closing of either one or both of the switches, a pair of latching relays are energized which in turn provide electric power to the electro-mechanical sensors.

1 Claim, 2 Drawing Figures 4,314,307

ELECTRO-MECHANICAL SENSOR POWER UP CIRCUIT

STATEMENT OF GOVERNMENT INTEREST

The invention described herein may be manufactured and used by or for the government of the United States of America for governmental purposes without the payment of royalties thereon or therefor.

BACKGROUND OF THE INVENTION

The present invention generally relates to Automatic Flight Control System (AFCS) and more particularly to an electrical circuit which allows electric power to be applied to electromechanical sensors only when required for mission functions as indicated by the Engine Start switch and/or AFCS Engage switch initiation.

Conventional designs of an AFCS of an aircraft allows the application of electric power to the sensor whenever aircraft power is turned on for any ground maintenance or other checkout requirements. Consequently, any time aircraft maintenance or ground test is needed which requires the use of electrical ground power, the rate gyro sensors are activated and they run continuously and thus accumulate unnecessary operating time. Consequently, there has been a significant reduction of the useful life of the sensors used in the system. It is thus desirable to limit the power-on time to the electro-mechanical rate gyros or sensors on board the aircraft which has the direct effect of gaining a much greater useful life from the electro-mechanical sensors.

SUMMARY OF THE INVENTION

An electrical circuit according to the teachings of subject invention is an arrangement which allows electric power to be applied to the electro-mechanical sensors or rate gyros of the AFCS system of an aircraft only when required for mission functions as indicated in the specific application by the Engine Start switch and/or AFCS Engage switch initiation. The circuit provides two push button type switches which energize two latching relays which in turn provide the power to the electromechanical sensors of the AFCS system. The circuit limits the power-on time to the electro-mechanical rate gyros on board the aircraft which in turn increases the useful life for the electro-mechanical sensors.

An object of the subject invention is to increase the useful life of the electro-mechanical sensors used in an Automatic Flight Control System of an aircraft or the like by limiting the time for which the power is applied to the rate gyros to only when either the engine of the aircraft is started and/or AFCS test switch is engaged. This is indicative of impending flight or desired system operation for ground testing.

Another object of subject invention is to reduce the unnecessary time for which the rate gyros of an AFCS control system of an aircraft are powered during the conduct of unrelated ground testing.

Other objects, advantages and novel features of the invention will become apparent from the following detailed description when considered in conjunction with the accompanying drawings wherein:

DESCRIPTION OF A PREFERRED EMBODIMENT

Figure 1:
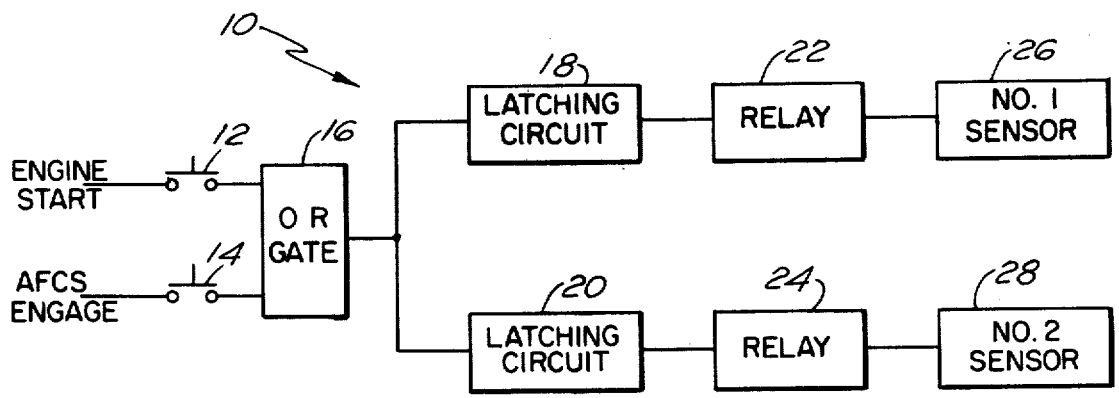
FIG. 1 is a schematic block diagram of an electrical circuit built according to the teachings of subject invention.
Figure 2:
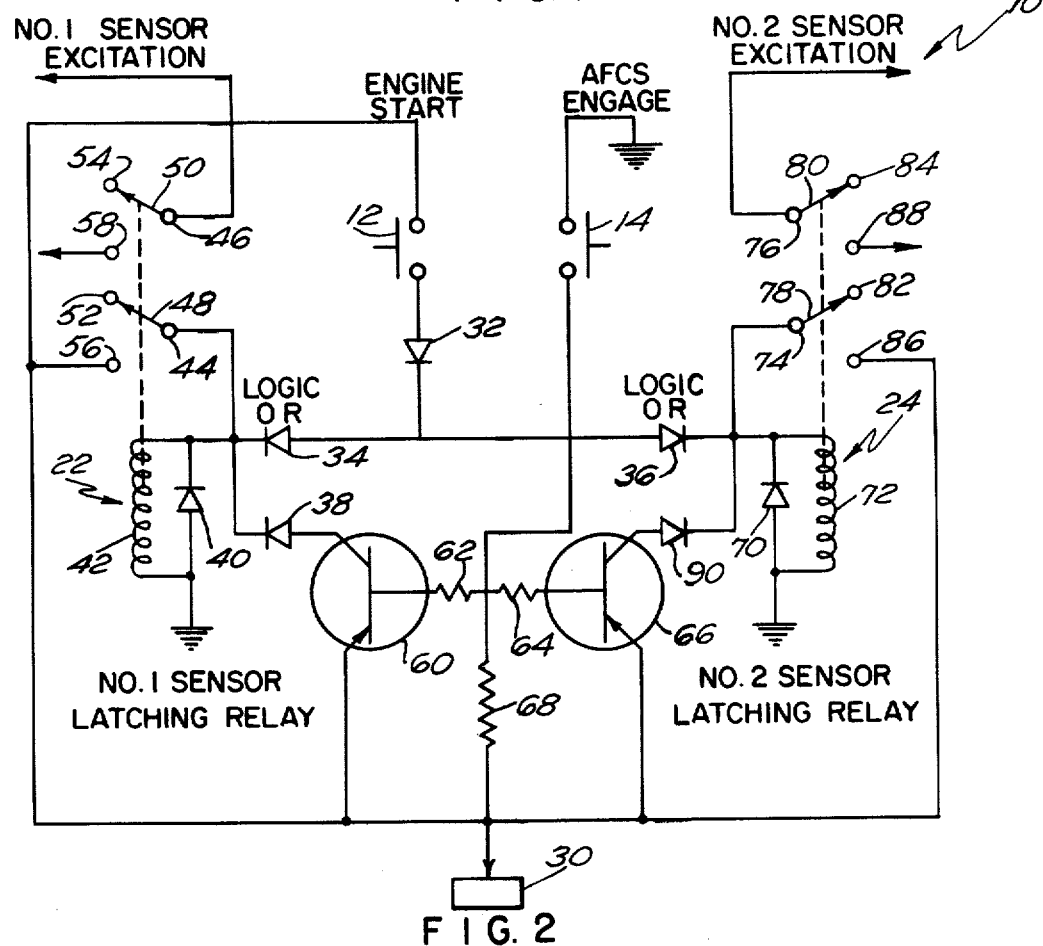
FIG. 2 is a schematic diagram of the electrical circuit showing an embodiment of the device of subject invention.

Referring to the drawings, FIG. 1 shows a block diagram of an electrical circuit built according to the teachings of subject invention. Circuit 10 includes two switches 12 and 14 which activate, through OR Gate 16, latching circuits 18 and 20 when switch 12 and/or switch 14 are closed momentarily. Energized latching circuits 18 and 20 activate relays 22 and 24 and the latching circuits 18 and 20 remain energized unless the aircraft power is turned off. This in turn supplies electrical power to sensors 26 and 28 which include their respective rate gyros. FIG. 2 is a detailed circuit diagram of electrical circuit 10 built according to the teachings of subject invention. Circuit 10 includes two push button switches 12 and 14. One end of switch 12 is connected to a 28 volt D.C. power supply 30 while the other end is connected to the anode terminal of diode 32 having its cathode terminal connected to the anode terminal of each of Logic OR circuits 34 and 36. Cathode terminal of Logic OR circuit 34 is connected to the cathode terminal of each of diodes 38 and 40, one end of solenoid 42 of relay 22 and to terminal 44. Fixed end of wiper arm 48 is connected to terminal 44 and the fixed end of wiper arm 50 is connected to terminal 46. The movable end of each of wiper arms 48 and 50 move from their respective positions at terminal 52 and 54 respectively to the respective terminals 56 and 58 when relay 22 is energized. Terminal 58 is connected to sensor 26. Terminal 56 is also connected to 28 volt D.C. power supply 30. Anode of the diode 38 is connected to the collector terminal of transistor 60 which has its emitter terminal connected to D.C. power supply 30. Base terminal of transistor 60 is connected to one end of resistor 62. The other end of resistor 62 is connected to one end of resistor 64 which has its second end connected to the base terminal of transistor 66. The emitter terminal of transistor 66 is connected to power supply 30. One end of switch 14 is connected to ground and the second end thereof is connected to power supply 30 through resistor 68 and to the junction of resistors 62 and 64. The cathode terminal of Logic OR circuit 36 is connected to cathode terminal of diode 70 and one end of solenoid 72 of relay 24. The opposite end of solenoid 72 and the anode terminal of diode 70 are connected to ground. The fixed end of wiper arm 78 is connected to terminal 74 and the fixed end of wiper arm 80 is connected to terminal 76 which is connected to the source of excitation for sensor 28. Wiper arms 78 and 80 have their respective movable ends connected to terminals 82 and 84. Upon energizing of the solenoid 72 of relay 24, movable ends of wiper arms 78 and 80 are connected to terminals 86 and 88 respectively. Terminal 86 is also connected to power supply 30 and terminal 88 is connected to sensor 28. The collector terminal of transistor 66 is connected to the anode terminal of diode 90 which its cathode terminal connected to the cathode to the cathode terminal of diode 70. Terminal 46 is connected to the source of excitation for sensor 26 and terminal 76 is connected to the source of excitation for sensor 28.

In operation, when switch 14 is controlling the AFCS Engage is pressed, the current flows through resistor 68 which provides forward bias to transistors 60 and 66 which act as short circuits and thus supply electric current to solenoids 42 and 72 of the relays 22 and 24 respectively so as to connect the movable ends of wiper arms 48 and 50 to terminals 56 and 58 respectively. At the same time the movable ends of wiper arms 78 and 80 are connected to terminals 86 and 84 respectively. The wiper arms 50 and 80 in this position supply electric power to sensors 26 and 28 and their respective gyros. When terminals 56 and 86 are connected to terminals 44 and 74 respectively through the respective wiper arms 48 and 78, the latching circuits 18 and 20 are latched on by short circuiting their respective transistors 60 and 66 and they remain in their latched state unless the power to the aircraft is turned off. Equivalent relay activation can be achieved by the pressing of switch 12 which provides sufficient current directly to solenoids 42 and 72 so as to energize them which move the movable ends of wiper arms 48 and 50 from terminals 52 and 54 to terminals 56 and 58 respectively and movable ends of wiper arms 78 and 80 from terminals 82 and 84 respectively to terminals 86 and 88 respectively, thus providing excitation voltage to the sensors 26 and 28. Thus, it can be seen that either by pressing the Engine Start switch 12 of AFCS Engage switch 14, both relays 22 and 24 are energized and consequently electric power to the two sensors 26 and 28 is applied so as to activate their rate gyros. It is further to be noted that until and unless either switch 12 and/or AFCS Engage switch 14 are closed, no excitation voltage will reach sensors 26 and 28. Thus, when the power is turned on for performing ground tests on the aircraft, no excitation will be available to the sensors 26 and 28 until either one or both of the two switches 12 and 14 are closed. It is to be noted further that the same excitation voltage will be available to the sensors 26 and 28 when both switches 12 and 14 are pressed simultaneously. This circuit provides the excitation voltage to the sensors and the rate gyros only when the Engine Start switch and/or AFCS Engage switch is closed. This eliminates the unnecessary excitation of the rate gyros when the aircraft is supplied with power for on-ground tests. Consequently, this enhances the useful life of the sensors and the rate gyros.

Briefly stated, an electrical circuit is provided wherein Engine Start switch and/or AFCS Engage switch either pressed simultaneously or separately energize and hold in the energized state the relays which in turn provide excitation voltage to the two sensors in the AFCS system of an aircraft. The circuit is designed in such a way that it limits the power-on time to the electro-mechanical rate gyros on board the aircraft which has the direct effect of gaining a much greater useful life from the life limited sensors.

Obviously, many modifications and variations of the present invention may become apparent in the light of the above teachings. As an example, the design of the circuit could be changed to apply excitation power to any selected sensors only when logic indicative of required sensor activation is satisfied, such as the Engine Start or AFCS Engagement switches individually as cited herein, or by such as a sequential switch initiation pattern.

Furthermore, the number of latching circuits and relays used can be varied; the dual latching circuit relay configuration described herein is an embodiment designed specifically to maintain excitation independence. It is therefore understood that within the scope of the appended claims the invention may be practiced otherwise than as specifically described.

We claim:

1. An electrical circuit for improving the useful life of a plurality of electromechanical sensors including rate gyros of an automatic flight control system of an aircraft comprising:

means for energizing a plurality of latching circuits upon command including at least one pair of push button switches closable separately or simultaneously;

a plurality of relays which are activated upon energizing separately or simultaneously of said plurality of latching circuits, said relays having means for providing electric power to said plurality of electro-mechanical sensors; and means for energizing said plurality of electro-mechanical sensors only when the aircraft power and at least one of said pair of push button switches are on including a plurality of transistors which are short circuited upon closing of at least one of said pair of push button switches and thus energizing and keeping energized said plurality of relays during power-on interval of the aircraft.

* * * * *